US012760691B2

(12) United States Patent
Kraewer et al.

(10) Patent No.: US 12,760,691 B2
(45) Date of Patent: Oct. 13, 2026

(54) METHOD FOR OPERATING AN INTERNAL COMBUSTION ENGINE, COMPUTING UNIT, AND COMPUTER PROGRAM

(71) Applicant: Robert Bosch GmbH, Stuttgart (DE)

(72) Inventors: Bernd Kraewer, Winnenden (DE); Christof Kirchmaier, Ludwigsburg (DE); Michael Fey, Wiernsheim (DE)

(73) Assignee: Robert Bosch GmbH, Stuttgart (DE)

( * ) Notice: Subject to any disclaimer, the term of this patent is extended or adjusted under 35 U.S.C. 154(b) by 860 days.

(21) Appl. No.: 18/248,150

(22) PCT Filed: Sep. 23, 2021

(86) PCT No.: PCT/EP2021/076149
§ 371 (c)(1),
(2) Date: Apr. 6, 2023

(87) PCT Pub. No.: WO2022/073767
PCT Pub. Date: Apr. 14, 2022

(65) Prior Publication Data

US 2023/0407806 A1 Dec. 21, 2023

(30) Foreign Application Priority Data

Oct. 8, 2020 (DE) ..................... 10 2020 212 725.5

(51) Int. Cl.
*F02D 41/14* (2006.01)
*F02D 41/28* (2006.01)

(52) U.S. Cl.
CPC ......... *F02D 41/1444* (2013.01); *F02D 41/28* (2013.01)

(58) Field of Classification Search
CPC .... F02D 41/1444; F02D 41/28; F02D 41/146; F02D 41/1475; F02D 41/1456; F02D 2041/286; F02D 2200/10
(Continued)

(56) References Cited

U.S. PATENT DOCUMENTS 6,968,679 B2 11/2005 Pott
10,927,738 B2 * 2/2021 Knopp .................... F01N 3/206
(Continued)

FOREIGN PATENT DOCUMENTS

DE 19933712 A1 5/2001
DE 10205817 A1 8/2003
(Continued)

OTHER PUBLICATIONS

Translation of International Search Report for Application No. PCT/EP2021/076149 dated Jan. 12, 2022 (3 pages).

*Primary Examiner* — Hai H Huynh
(74) *Attorney, Agent, or Firm* — Michael Best & Friedrich LLP

(57) ABSTRACT

The invention relates to a method (200) for operating an internal combustion engine (110), comprising providing and combusting an air-fuel mixture of a first composition, determining (210) a current composition of a combustion exhaust gas produced during the combustion, determining (220) an emission collective, which comprises a total amount emitted over a predefined interval for at least one component of the combustion exhaust gas, from multiple successively determined current compositions of the combustion exhaust gas, and setting (250) a second composition of the air-fuel mixture depending on the emission collective determined. The invention also relates to a computing unit and a computer program product for carrying out such a method.

10 Claims, 2 Drawing Sheets

(58) Field of Classification Search
USPC ........ 701/103, 104, 105; 123/672, 679, 703, 123/704
See application file for complete search history.

(56) References Cited

U.S. PATENT DOCUMENTS

| | | | | |
|---|---|---|---|---|
| 11,111,873 | B2 * | 9/2021 | Wagner | F02D 41/1446 |
| 2004/0206072 | A1 | 10/2004 | Surnilla et al. | |
| 2010/0212291 | A1 * | 8/2010 | Schnaibel | F02D 41/1441 60/276 |
| 2014/0014081 | A1 | 1/2014 | Azadeh | |
| 2014/0159092 | A1 | 6/2014 | Konishi et al. | |

FOREIGN PATENT DOCUMENTS

| | | | |
|---|---|---|---|
| DE | 102016222418 | A1 | 5/2018 |
| DE | 102017215251 | A1 | 2/2019 |
| DE | 102018213076 | A1 | 2/2020 |
| EP | 2620625 | A2 | 7/2013 |
| EP | 3073078 | A2 | 9/2016 |
| JP | 2013108459 | A | 6/2013 |

* cited by examiner

METHOD FOR OPERATING AN INTERNAL COMBUSTION ENGINE, COMPUTING UNIT, AND COMPUTER PROGRAM

BACKGROUND OF THE INVENTION

The present invention relates to a method for operating an internal combustion engine and to a computing unit and a computer program for carrying out the same.

In order to remove pollutants from exhaust gases, catalytic converters and sensors, in particular exhaust sensors such as lambda probes, are generally installed in the exhaust systems of vehicles with internal combustion engines. Since such components are mandatory for compliance with the specified limits, they are usually monitored by various diagnostics.

In order to keep pollutant emissions low, a stoichiometric air-fuel ratio (lambda=1) can generally preferably be aimed for, in particular in systems with gasoline engines. This means that there is exactly as much oxygen as is needed to completely burn the fuel into carbon dioxide and water. There are also operating strategies for other engine concepts that make operation with an exhaust gas lambda of 1 necessary (e.g., regeneration of particulate filters, heating strategies, etc.).

For diagnostic purposes, it may be necessary to actively adjust the setpoint of the combustion lambda in order to assess the reaction of the components in the exhaust system to the lambda adjustment. For example, this may be dynamics diagnostics or offset diagnostics for lambda probes or, in the case of the catalytic converter, a diagnosis of the oxygen storage capability.

SUMMARY OF THE INVENTION

According to the invention, a method for operating an internal combustion engine as well as a computing unit and a computer program for carrying out the same is proposed. Advantageous embodiments are the subject of the following description.

A method for operating an internal combustion engine according to the invention comprises providing and combusting an air-fuel mixture of a first composition, determining a current composition of a combustion exhaust gas produced during the combustion, determining an emission collective, which comprises a total amount emitted over a predefined interval for at least one component of the combustion exhaust gas, from multiple successively determined current compositions of the combustion exhaust gas, and setting a second composition of the air-fuel mixture depending on the emission collective determined. As a result, when controlling the internal combustion engine, not only is the current emission behavior taken into account, as is usual in conventional methods, but compliance with limit values is, for example, monitored over an entire operating or driving cycle, thus enabling an overall reduction in emissions.

Advantageously, the emission collective relates to work performed by the internal combustion engine and/or an operating time of the internal combustion engine and/or a distance traveled by a vehicle driven by the internal combustion engine. These are used, for example, as the basis for statutory requirements relating to maximum emissions and are therefore particularly important reference values.

In particular, setting the second composition comprises lowering the fuel content in the air-fuel mixture if rich gas components predominate in the emission collective, and/or increasing the fuel content if lean gas components predominate in the emission collective. This can avoid a displacement of the emission behavior toward a component that is already overrepresented on average.

Within the framework of the present invention, rich gas components are understood to be any chemical compound produced by combustion of a fuel with a substoichiometric amount of oxygen, i.e., in particular hydrocarbons or partially oxidized hydrocarbons (for example, mono- or polyhydric alcohols, aldehydes, ketones, carboxylic acids, and their respective derivatives as well as combinations thereof), carbon monoxide, ammonia, and hydrogen. Lean gas components, on the other hand, include compounds, in particular various nitrogen oxides, that are formed in particular during combustion of fuel with a superstoichiometric amount of oxygen.

In this respect, a predominance of a component is characterized in particular in that a proportion of the predominant component in the emission collective has a smaller distance from a threshold value assigned to it than all proportions of other components from a threshold value respectively assigned to them. This offers the advantage that different threshold values can be assigned, for example depending on a hazard potential emanating from the particular component. The mentioned distance can be calculated in particular in the form of a relative distance from the respective threshold value.

Preferably, setting the second composition is performed depending on a need for at least one of a plurality of measures. Thus, in principle, a composition that is optimal for emission can be selected and a displacement of the composition is only carried out if a requirement exists.

The measures in particular comprise diagnosing and/or maintaining at least one element of the internal combustion engine and/or of an exhaust gas aftertreatment system downstream of it. Examples of such measures include, in particular, catalytic converter diagnostics, lambda probe diagnostics, a so-called catalytic converter cleanout, the regeneration of a particulate filter, a so-called catalyst heating, and the like.

In particular, the measures are carried out sequentially, and the method furthermore comprises establishing a sequence for carrying out the plurality of measures based on the predominant component. In this manner, for example, the storage capacity of a catalytic converter can be optimally utilized and emissions of pollutants downstream of the catalytic converter can be avoided overall or at least reduced.

In general, the use of sensors and models in the exhaust system makes it possible to draw conclusions about the emissions currently occurring. Examples of such emissions are nitrogen oxides (NOx), ammonia ($NH_3$), carbon monoxide (CO), hydrocarbons (HC), hydrogen ($H_2$) and, as a measure of fuel consumption, carbon dioxide ($CO_2$).

In particular, the present invention enables early detection of an (imminent) exceeding of statutory exhaust-gas limit values. By integrating the current emission values over an interval, in particular over time, and possibly with a weighting of the integration values over the distance driven in the current driving cycle, the currently accumulated emissions (i.e., the emission collective) can be compared with respectively applicable threshold values. With the help of the information obtained regarding the accumulated emissions, a general lambda setpoint and a lambda value for unavoidable active adjustments can in particular be specifically influenced in such a manner that the emissions of exhaust gas components with an already high accumulated value or emission collective do not increase additionally, and that all emission specifications are fulfilled in the current driving cycle.

Preferably, the setpoint of the lambda control is selected in such a manner that the emission of certain exhaust gas components is specifically avoided. For example, a slightly rich setpoint (i.e., less oxygen content in the air-fuel mixture than would be necessary for complete combustion of the fuel) is selected if the previous nitrogen oxide emissions were high, or a rich setpoint is deliberately avoided if, for example, hydrocarbons and/or carbon monoxide (or other exhaust gas components that are increasingly formed due to a lack of oxygen during combustion or in downstream processes of exhaust gas aftertreatment, such as ammonia) have high emission collectives relative to the threshold value.

Furthermore, in embodiments, it is provided to specifically adjust the sequence strategy of the diagnostics of the exhaust gas components taking into account the accumulated emissions. For example, in markets in which only the finding of symmetrical dynamic faults of lambda probes is required, it can be decided whether the dynamics diagnostics should be carried out with a rich preconditioning and a subsequent measurement jump to lean or vice versa.

Preferably, sensors that provide information regarding the current exhaust gas composition are installed in such a system. Such sensors may be, for example, lambda probes, nitrogen oxide sensors, temperature sensors, etc.

Preferably, additional (mathematical) models are available, which convert measurement data into the actual raw emissions at the exhaust of the combustion engine, or into the actual emissions downstream of a catalytic converter. Such a model is described, for example, in DE 10 2016222418 A1.

In addition to the distance traveled in the driving cycle and the lambda value of the exhaust gas, other measured or modeled variables can be used to weight the results or to increase accuracy. Examples for such variables are in particular temperatures, mass flows, and pressures.

It should be emphasized that, although an application of the invention in a vehicle is particularly advantageous since particularly strict statutory requirements apply with regard to permissible emissions in such cases, this is not the only possible application. Rather, other applications are also provided, in particular also in relation to stationary internal combustion engines. The internal combustion engine used may in principle be any type of internal combustion engine, for example a gasoline engine, a diesel engine, a spark-ignition lean-burn engine, a rotary engine, or the like. It may also be advantageous to apply the invention in conjunction with a plurality of internal combustion engines, in particular with a coupled exhaust system.

A computing unit according to the invention, e.g., a control unit of a motor vehicle, is configured, in particular programmatically, to carry out a method according to the invention.

The implementation of a method according to the invention in the form of a computer program or computer program product with program code for carrying out all method steps is also advantageous since this results in particularly low costs, in particular if an executing control unit is also used for further tasks and is therefore present in any event. Suitable data carriers for providing the computer program are, in particular, magnetic, optical, and electric storage media, such as hard disks, flash memory, EEPROMs, DVDs, and others. It is also possible to download a program via computer networks (Internet, Intranet, etc.).

Further advantages and embodiments of the invention can be found in the description and the accompanying drawing.

BRIEF DESCRIPTION OF THE DRAWINGS

The invention is illustrated schematically in the drawing on the basis of an exemplary embodiment and is described below with reference to the drawing.

DETAILED DESCRIPTION

Figure 1:
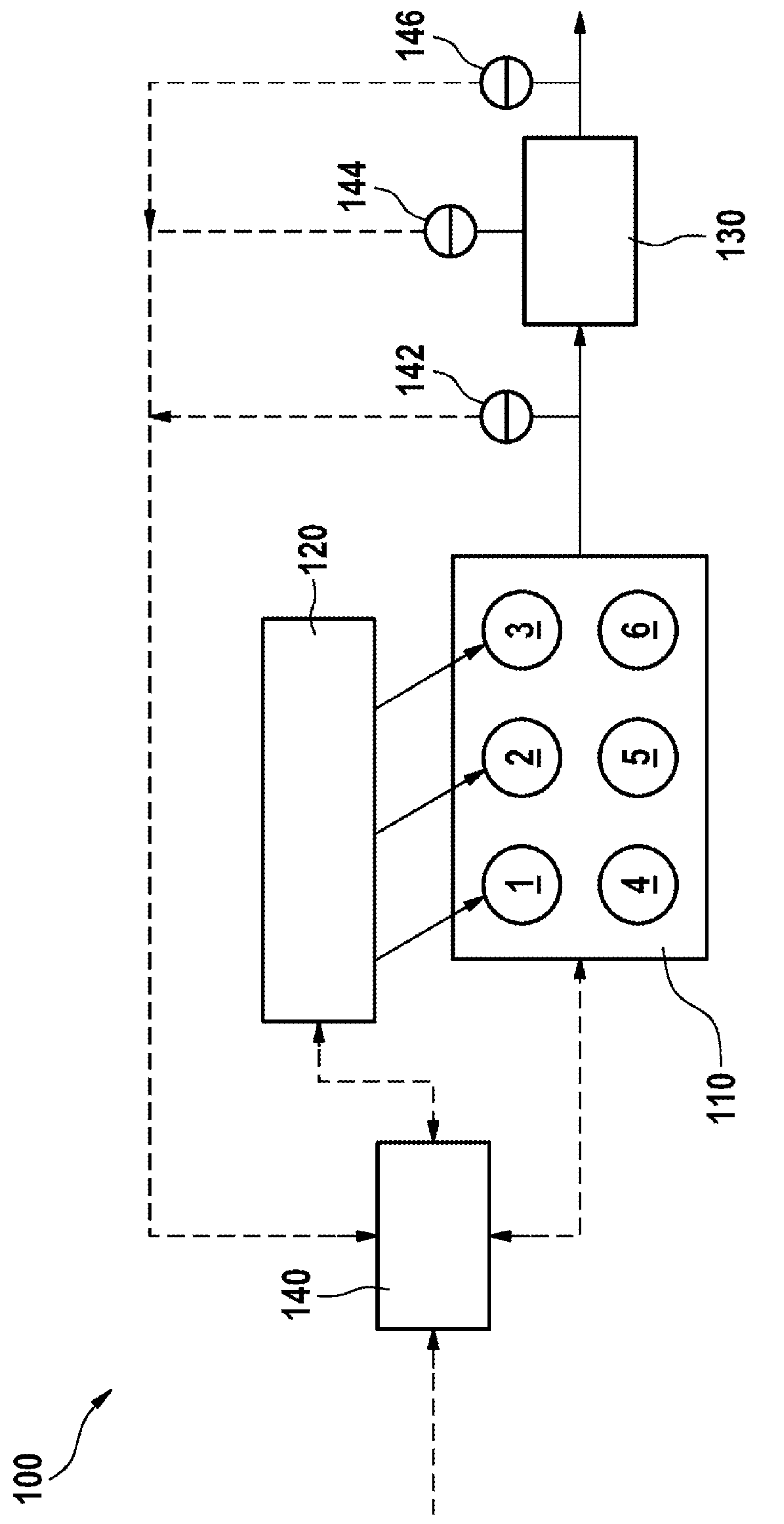
FIG. 1 shows an arrangement with an internal combustion engine for carrying out an advantageous embodiment of a method according to the invention in the form of a schematic block diagram.

In FIG. 1, an arrangement with an internal combustion engine 110, which can be used to carry out an advantageous embodiment of a method according to the invention, is shown schematically in the form of a block diagram and is denoted by 100 overall.

In addition to the internal combustion engine 110, which may be designed as a gasoline engine, a diesel engine, or a rotary engine, for example, the arrangement 100 comprises an injection system 120, an exhaust-gas catalytic converter 130, and a computing unit 140 (a so-called engine control unit, ECU).

The internal combustion engine 110 comprises a plurality of combustion chambers 1-6, which are supplied with fuel by the injection system 120 during the operation of the internal combustion engine 110. The number of combustion chambers is irrelevant to the present invention. The injection system may be a direct injection system, for example, but the invention is equally suitable for intake manifold injection systems. The computing unit 140 monitors and controls the operation of the arrangement 100 and receives control signals from outside the arrangement 100, for example via a control unit, such as a pedal, switch, or the like. For example, the computing unit may be configured to, depending on a received control signal, cause the injection system to meter fuel into each or certain of the combustion chambers 1-6, to set ignition times for the combustion chambers 1-6 of the internal combustion engine, to receive signals from components of the arrangement 100, and/or to determine operating parameters of the internal combustion engine 110, the injection system 120, and/or the exhaust-gas catalytic converter 130.

For its part, the injection system 120 is configured to, depending on control signals that it receives from the computing unit 140, supply fuel individually to each of the combustion chambers 1-6 in a quantity defined by the control signals and at a defined point in time. In principle, this may be done in any manner that is suitable for such a defined metering. For example, a fuel pump can supply fuel at a particular pressure to one or more manifolds (rail), each of which supplies fuel to a plurality of the combustion chambers 1-6, wherein the pressure can be predefined or controlled or regulated. The quantity and point in time of the respective metering can then be controlled via controlled combustion-chamber-specific injection valves. Another example would be an injection arrangement assigned to just one combustion chamber, for example in the form of a conventional pump-nozzle combination or a combustion-chamber-specific injection pump. This list expressly represents only exemplary embodiments and makes no claim to completeness.

The exhaust-gas catalytic converter 130 is configured to react exhaust gas components produced during the operation of the internal combustion engine 110 with one another in order to convert pollutants to less harmful compounds. For example, the exhaust-gas catalytic converter 130 may be provided as a conventional three-way catalytic converter. In particular, in cases in which the internal combustion engine 110 is designed as a diesel engine, an oxidizing catalytic converter and/or SCR catalytic converter may also be used as the exhaust-gas catalytic converter 130. For purposes of explanation, the use of a three-way catalytic converter is assumed below.

In particular, the exhaust-gas catalytic converter 130 is, in principle, particularly effective in a defined catalytic converter window, wherein the catalytic converter window describes a range of exhaust gas compositions. In particular, the components oxygen, rich gas components, and carbon monoxide play an important role here. Therefore, in normal operation, the operation of the internal combustion engine 110 is usually controlled to produce an exhaust gas having a composition corresponding to an air number of 1. However, if the internal combustion engine 110 is operated, for example, in a so-called overrun mode, i.e., in such a manner that it exerts a deceleration torque on a downstream drive train, in particular on a clutch input shaft and/or a gearbox, the rich gas components and carbon monoxide are usually absent in the exhaust gas since little or no fuel is injected into the combustion chambers 1-6 of the internal combustion engine 110. In such an operating phase, this reduces fuel consumption and also the corresponding exhaust emissions but subsequently has a negative effect on the conversion capacity of the exhaust-gas catalytic converter 130 since it then has too much oxygen stored. Therefore, conventionally, after an end of such an overrun mode phase, a rich air-fuel mixture can be injected into the combustion chambers 1-6 of the internal combustion engine 110 in order to produce a rich exhaust gas. This allows the exhaust-gas catalytic converter 130 to be returned to the catalytic converter window relatively quickly. This represents a conventional measure for the rapid resumption of catalytic converter operation after an overrun mode phase.

During the operation of the internal combustion engine 110, the composition of the exhaust gas produced by the internal combustion engine 110 and converted by the exhaust-gas catalytic converter is determined, in particular using exhaust gas sensors 142, 144, 146, which may be provided, for example, as wideband lambda probes, step lambda probes, and/or nitrogen oxide sensors. For this purpose, signals from the sensors 142, 144, 146 are transmitted to the computing unit 140 and evaluated by the latter. Depending on the signals received, the composition of the air-fuel mixture injected into the combustion chambers 1-6 of the internal combustion engine 110 is controlled. For this purpose, throttle valves in an air path of the injection system 120 can be set, for example, or the delivery rate of a fuel pump can be controlled accordingly. Such a control of the composition of the air-fuel mixture represents a conventional measure for controlling the exhaust gas composition.

Within the scope of the present invention, the computing unit additionally logs how the current composition of the exhaust gas develops over time, or the current compositions are added up or averaged and/or integrated over an interval (e.g., with respect to time or work or distance). Thereby, an emission collective is determined for at least one, preferably a plurality of components of the exhaust gas, which emission collective comprises, for example, the total quantity of exhaust gas components emitted in an operating cycle, e.g., the current stage of a route. Of particular relevance in this respect are the components nitrogen oxides, hydrocarbons, and carbon monoxide since these are regularly subjected to particularly stringent statutory regulation. The emission collective is then matched with threshold values for the respective exhaust gas components. The threshold values may be stored in the control unit 140 itself, for example, or may be retrieved or received from outside the arrangement, in particular via a wireless connection. In the latter case, currently valid (local or temporal) limit values can respectively be taken into account.

During the adjustment, for example, a distance of the total quantity determined in the emission collective from a maximum quantity permitted according to the threshold values can be determined for each monitored exhaust gas component. The further control of the internal combustion engine 110 or the injection system 120 can then take these distances into account in such a manner that adjustments of the composition of the air-fuel mixture are only made in one direction, which adjustments cause a change in the exhaust gas composition in such a manner that the components that are already close to their permissible limit are produced to a lesser extent, while components whose total quantity is still a large distance from the respective maximum quantity can be formed to a greater extent.

This is in particular advantageous in connection with diagnostic or maintenance functions relating to individual elements 130, 142, 144, 146. Such diagnostic and maintenance functions often require a non-stoichiometric composition of the air-fuel mixture. For example, a so-called catalytic converter cleanout can require a rich exhaust gas, while some diagnostic functions designed to detect malfunctions of a lambda probe require a lean exhaust gas. Therefore, depending on the nature of the emission collective at a particular point in time during the operation of the internal combustion engine 110, a diagnostic function requiring a lean exhaust gas can, for example, be carried out if the total amount of rich gas components in the emission collective is currently close to the assigned threshold value, while nitrogen oxides (a typical lean component), for example, play a minor role in terms of quantity. In this manner, compliance with limit values can be ensured over the entire operating period, without having to dispense with necessary diagnostic functions. Conversely, of course, a measure requiring a rich exhaust gas can only be carried out if lean gas components predominate in the emission collective, as explained at the beginning.

Figure 2:
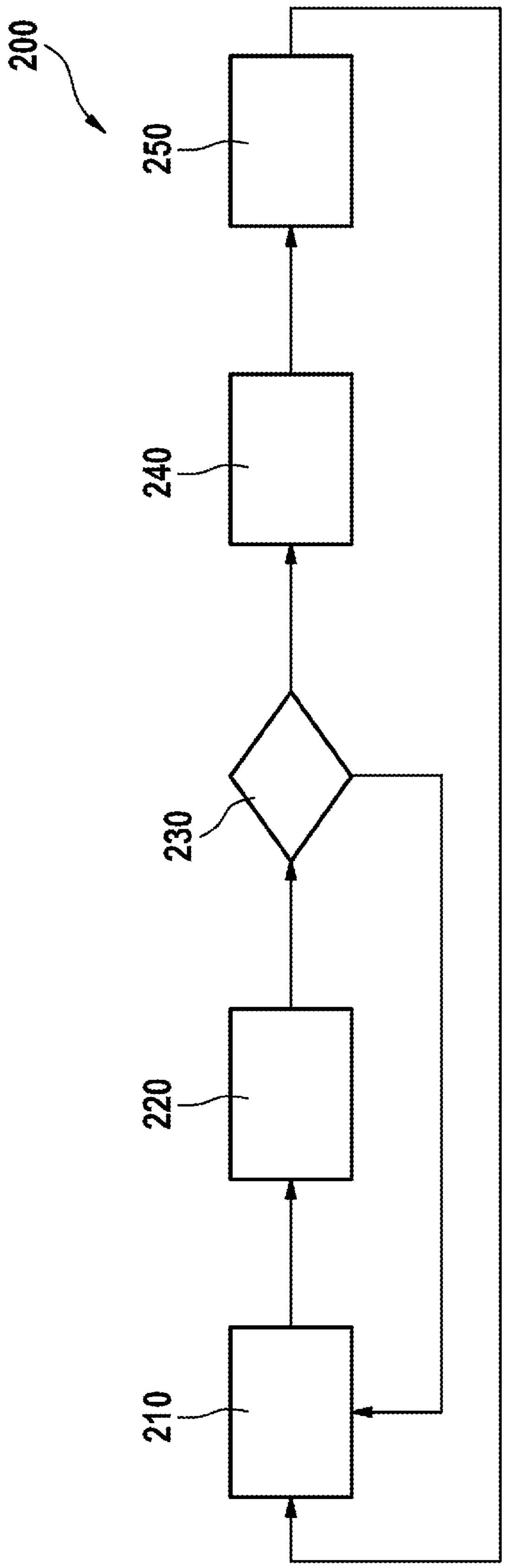
FIG. 2 shows an advantageous embodiment of a method according to the invention in a simplified illustration in the form of a flow chart.

In FIG. 2, an advantageous embodiment of a method according to the invention is shown in the form of a simplified flow chart and denoted by 200 overall. References, in particular to device components, in the description of FIG. 2 may also refer to reference signs in FIG. 1.

In a first step 210 of the method 200, a current exhaust gas composition downstream of the internal combustion engine 110 is determined. For this purpose, in particular the signals from lambda probes and/or nitrogen oxide sensors 142, 144, 146 described with reference to FIG. 1 may be evaluated by the control unit 140.

In a step 220, an emission collective is determined from the current composition of the exhaust gas in conjunction with compositions determined beforehand in time. For this purpose, the respective current compositions may be integrated, for example, over a time or a distance traveled.

Furthermore, in step 220, the respective total amounts of exhaust gas components that are combined in the emission collective can be matched against one or more corresponding threshold values. Thereby, for example, relative distances of the currently determined emitted total quantity of a component from its respective threshold value or its maximum permissible quantity can be determined.

In a step 230, it is determined whether an adjustment of the composition of the air-fuel mixture is required. If this is not the case, the method 200 returns to step 210 and continues recording the exhaust gas composition.

If, on the other hand, it is established in step 230 that an adjustment of the composition of the air-fuel mixture and thus also of the exhaust gas composition is required in order to carry out one or more measures, the method continues with a step 240, in which a sequence of the required measures or a performance mode of the required measure is determined depending on the emission collective determined in step 220 (or, in particular, of the determined distances of the component quantities from their respective threshold values).

In a subsequent step 250, the measure(s) is/are carried out according to the sequence or performance mode established in step 240. Thereafter, the method can return to step 210.

It should be expressly emphasized here that the method explained with reference to FIG. 2 is an exemplary embodiment of the invention, from which it is entirely possible to deviate within the scope of the invention. In particular, some steps may be carried out in a different, for example reverse, sequence. Some of the steps may also be carried out in parallel or in a combined manner, if necessary.

It should also be expressly noted here once again that the arrangement 100 in FIG. 1 is shown only schematically and can also contain other or additional elements, for example, one or more additional catalytic converters, sensors, particulate filters, or the like. If necessary, such additional or alternative elements may also be controlled within the scope of the invention, or signals provided by them may be used to determine the emission collective (step 220) or to establish the measures to be carried out or their sequence (step 250).

The invention claimed is:

1. A method (200) for operating an internal combustion engine (110), the method comprising:

providing and combusting an air-fuel mixture having a first composition, determining (210), via a computer, a current composition of a combustion exhaust gas produced during the combustion, determining (220), via a computer, an emission collective which comprises a total amount of a component of the combustion exhaust gas emitted over a predefined interval, from a plurality of successively determined current compositions of the combustion exhaust gas, and setting (250), via a computer, a second composition of the air-fuel mixture depending on the emission collective determined.

2. The method (200) according to claim 1, wherein the emission collective refers to (a) work performed by the internal combustion engine (110), to (b) an operating time of the internal combustion engine (110), to (c) a distance traveled by a vehicle driven by the internal combustion engine (110), or a combination of (a), (b), and (c).

3. The method (200) according to claim 1, wherein the setting (250) of the second composition comprises lowering the fuel content in the air-fuel mixture when rich gas components predominate in the emission collective and increasing the fuel content when lean gas components predominate in the emission collective.

4. The method (200) according to claim 3, wherein a predominance of a component is characterized in that a proportion of the predominant component in the emission collective has a smaller distance from a threshold value assigned to it than all proportions of other components from a threshold value respectively assigned to them.

5. The method (200) according to claim 1, wherein the setting (250) of the second composition is performed depending on a need (230) for at least one of a plurality of measures (250).

6. The method (200) according to claim 5, wherein the measures (250) comprise diagnosing and/or maintaining at least one element of the internal combustion engine and/or an exhaust gas aftertreatment system (130) downstream of it.

7. The method (200) according to claim 5, wherein the measures are carried out sequentially, and the method furthermore comprises establishing (240) a sequence for carrying out the plurality of measures (250) based on the predominant component.

8. The method (200) according to claim 1, wherein the emission collective is determined by accumulating, averaging, and/or integrating a component of the combustion exhaust gas over the predefined interval based on the plurality of successively determined current compositions, such that the emission collective represents a total quantity of the component of the combustion exhaust gas emitted during the predefined interval, and wherein the emission collective is compared to a threshold value associated with the component of the combustion exhaust gas.

9. A computer (140) configured to control operation of an internal combustion engine (110), by controlling delivering of an air-fuel mixture having a first composition for combustion in the internal combustion engine, determining (210) a current composition of a combustion exhaust gas produced during the combustion, determining (220) an emission collective which comprises a total amount of a component of the combustion exhaust gas emitted over a predefined interval, from a plurality of successively determined current compositions of the combustion exhaust gas, and setting (250) a second composition of the air-fuel mixture depending on the emission collective determined.

10. A non-transitory, computer-readable storage medium containing instructions that when executed by a computer cause the computer to control operation of an internal combustion engine (110), by controlling delivering of an air-fuel mixture having a first composition for combustion in the internal combustion engine, determining (210) a current composition of a combustion exhaust gas produced during the combustion, determining (220) an emission collective which comprises a total amount of a component of the combustion exhaust gas emitted over a predefined interval, from a plurality of successively determined current compositions of the combustion exhaust gas, and setting (250) a second composition of the air-fuel mixture depending on the emission collective determined.

* * * * *